United States Patent [19]

Iwano et al.

[11] Patent Number: 4,895,425
[45] Date of Patent: Jan. 23, 1990

[54] PLUG-IN OPTICAL FIBER CONNECTOR

[75] Inventors: Shinichi Iwano, Mito; Etsuji Sugita, Tachikawa; Ryo Nagase, Mito; Kazunori Kanayama, Tokyo; Kenichi Nakano, Kokubunji; Yasuhiro Ando, Hoya, all of Japan

[73] Assignee: Nippon Telegraph and Telephone Corporation, Japan

[21] Appl. No.: 314,784

[22] Filed: Feb. 24, 1989

[30] Foreign Application Priority Data

Feb. 26, 1988 [JP] Japan .................................. 63-43842
Aug. 1, 1988 [JP] Japan ................................. 63-190652

[51] Int. Cl.$^4$ .............................................. G02B 6/36
[52] U.S. Cl. .............................. 350/96.20; 350/96.21; 350/96.22
[58] Field of Search ................. 350/96.20, 96.21, 96.22

[56] References Cited

U.S. PATENT DOCUMENTS

| | | | |
|---|---|---|---|
| 4,201,444 | 5/1980 | McCartney et al. | 350/96.21 |
| 4,217,030 | 8/1980 | Howarth | 350/96.21 |
| 4,255,016 | 3/1981 | Borsuk | 350/96.21 |
| 4,432,604 | 2/1984 | Schwab | 350/96.21 |
| 4,470,660 | 9/1984 | Hillegonds et al. | 350/96.21 |
| 4,487,474 | 12/1984 | Nishie et al. | 350/96.21 |
| 4,699,455 | 10/1987 | Erbe et al. | 350/96.20 |
| 4,758,063 | 7/1988 | Konechny, Jr. | 350/96.20 |
| 4,796,975 | 1/1989 | Lukas et al. | 350/96.20 X |
| 4,807,955 | 2/1989 | Ashman et al. | 350/96.20 |

*Primary Examiner*—William L. Sikes
*Assistant Examiner*—Brian M. Healy
*Attorney, Agent, or Firm*—Wigman & Cohen

[57] ABSTRACT

In a plug-in connector for connecting elements mounted on a backage board to other elements arranged on a back wiring board disposed perpendicular to the package board, the guide pin and the connector housing fixing screw are formed integral with each other to realize a floating connector coupling structure which is high in mounting efficiency and precision and small in size. Further, the plug-in connector can connect two different, optical and electrical connectors. Further, there is disclosed a novel optical connector plug whose radial eccentricity direction can be matched with that of a mated optical connector jack with an optical fiber aligning jig to minimize the optical fiber coupling power loss.

12 Claims, 9 Drawing Sheets

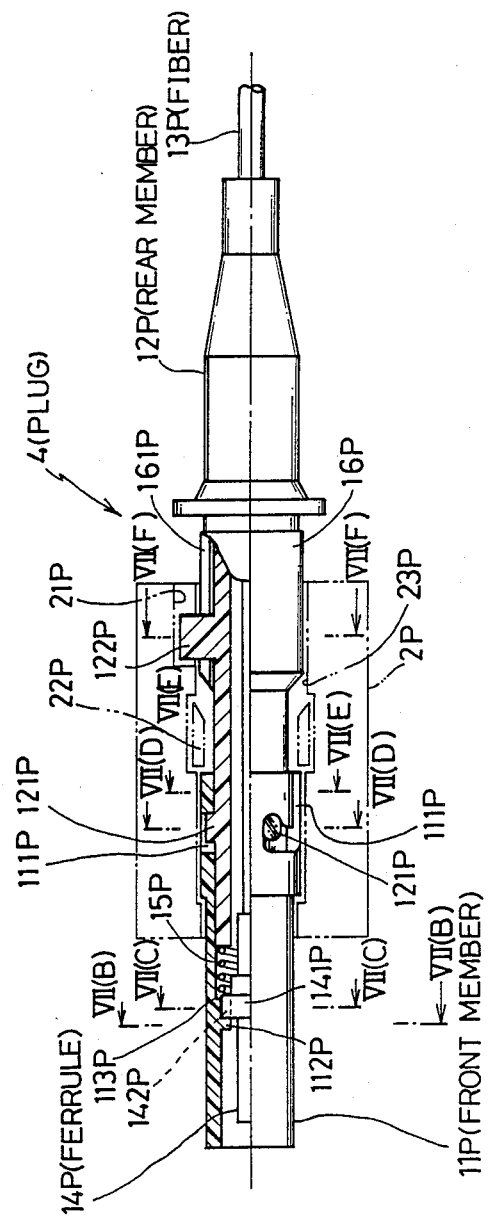

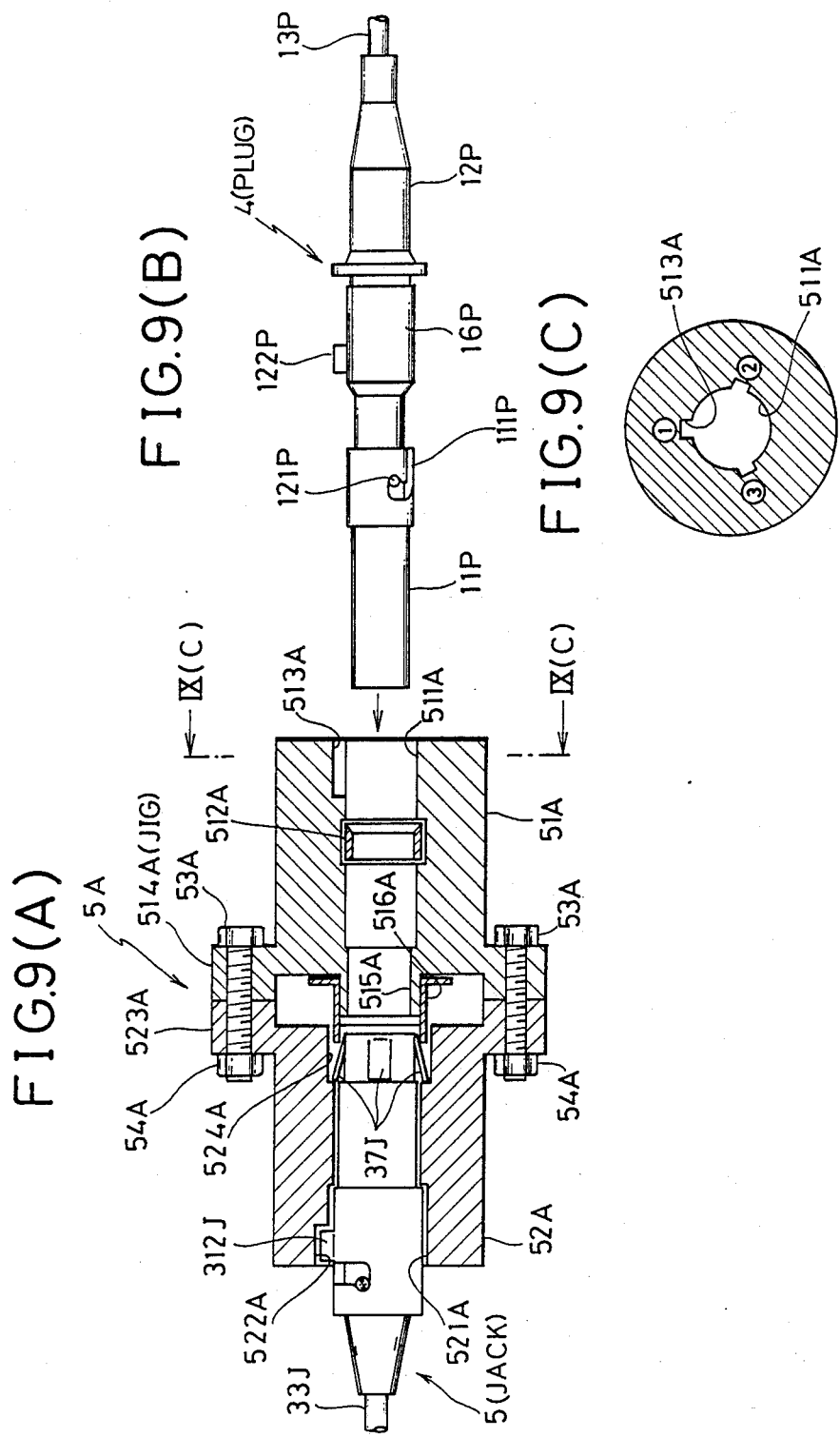

PLUG-IN OPTICAL FIBER CONNECTOR

BACKGROUND OF THE INVENTION

1. Field of the Invention

The present invention relates to a plug-in connector, and more specifically to a plug-in connector for removably connecting a package board (on which various electrical components or parts are mounted as a completed part subassembly) to a back wiring board perpendicular to the package board to construct an assembly unit including a plurality of parallel-arranged package boards.

2. Description of the Prior Art

In the above-mentioned assembly unit, optical fiber coupling elements (connectors) are often assembled together with electrical coupling elements (connectors). In usual, dimensional (positional) tolerance of the unit assembly or the electrical coupling elements is on the order of millimeter, while that of optical fiber coupling elements is on the order of several microns. To solve the problem caused by the above-mentioned large difference in tolerance between the electrical and optical connectors, only the optical connectors are so constructed as to be provided with adjustable gaps (floating structure) in the mated portions. That is, since the coupling method is different between the electrical and optical connectors, the electrical and optical connectors are conventionally separated from each other. Therefore, there exist various problems in that: (1) an appropriate space must be provided between the electrical and optical connectors to prevent interference between the two, and therefore the mounting efficiency is low; (2) since a large space is required, the number of electrical connector terminals are reduced markedly; (3) in the case of a small-sized package board (e.g. 100 mm wide boards), only the electrical or optical connector can be mounted.

Further, in the prior-art optical connectors, since there are provided plural guide pins for accurately locating two coupled optical connector housings, and plural connector housing fixing screws for fixing one of the two connector housings at a coupling position guided by the guide pins, separately, it has been difficult to increase the mounting efficiency or the number of optical connectors.

The arrangement of the prior-art plug-in connector will be described in further detail hereinafter with reference to the attached drawings under DETAILED DESCRIPTION OF THE PREFERRED EMBODIMENTS.

SUMMARY OF THE INVENTION

With these problems in mind, therefore, it is the primary object of the present invention to provide a plug-in connector high in element mounting efficiency, small in size, and accurate in dimensional precision.

Further, another object of the present invention is to provide a plug-in connector including two different, optical and electrical, coupling elements (connectors).

Further, still another object of the present invention is to provide an optical connector plug whose radial eccentricity direction can be matched with that of a mated optical connector jack by use of an optical fiber aligning jig (or tool) in order to minimize the optical fiber coupling power loss between the optical connector plug and jack.

To achieve the above-mentioned object, the plug-in connector of the present invention comprises: (a) at least one first optical fiber coupling means (5) mounted on the backage board (11); (b) at least one second optical fiber coupling means (4) arranged on the back wiring board (12) and coupled to said first optical fiber coupling means (5), said second optical fiber coupling means (4) being loosely passed through at least one hole (121) formed in the back wiring board (12); (c) at least two guide pins (33) formed, respectively with a guide portion (333), a flange portion (335), a floating support portion (332) loosely passed through a hole (122) formed in the back wiring board (12), and a fixed portion (331); (d) a package connector (2) fixed to the package board (11) and formed with at least two guide holes (22) including a truncated conical tapered portion (23), respectively to which the guide portion (333) of said guide pin is fitted, and with at least one hole to which said first optical fiber coupling means (5) is fitted; (e) a first connector housing (31) fixed to the back wiring board and engaged with said package connector (2), said first connector housing (31) being formed with at least two guide pin through holes (312) through each of which the floating support portion (332) of said guide pin (33) is loosely passed and with at least one second optical fiber coupling means through hole (313) through which the second optical fiber coupling means (4) is loosely passed; and (f) a second connector housing (32) formed with at least two guide pin fixing hole (322) to which the fixed portion (331) of said guide pin (33) is fixed and at least one hole to which the second optical fiber coupling means (4) is fitted, whereby said two guide pins (33) and said second optical fiber coupling means (4) all fixed to said second connector housing (31) loosely project, with a radial play, respectively from said back wiring board (12) and said first connector housing (31) via the through holes (312, 122 and 313, 121) formed in the back wiring board and said first connector housing, to support said second connector housing (32) under floating condition relative to the back wiring board, by sandwiching the back wiring board (12) and the first connector housing (31) between said second connector housing (32) and the flange portions (335) of said guide pins (33), when the first connector housing (31) is not connected to said package connector (2).

The first and second optical fiber coupling means (5) are optical connector jack and plug or vice versa. Further, it is preferable that the package connector (2) further comprises a plurality of first electrical connector terminals (7), and said back wiring board (12) further comprises a plurality of second electrical connector terminals (6) coupled to the first electrical connector terminals when coupled to each other.

Further, the optical connector plug according to the present invention comprises: (a) a ferrule (14P) attached to one end of an optical fiber (13P) and formed with a flange portion (141P) including at least one cutout portion (142P); (b) a front end side member (11P) formed with an inner step portion (112P) including at least one inner projection portion (113P) engaged with the cutout portion of said ferrule, and with at least three L-shaped grooves (111P) arranged at regular angular intervals; (c) a rear end side member (12P) formed with at least three projections (121P) selectively engaged with the three L-shaped grooves by changing angular position and with a reference guide projection (122P) engaged with a guide groove (21P) of said second connector housing (2P or 32); and (d) a spring (15P) disposed between the flange portion of said ferrule and an inner end of said rear end side member to fix said ferrule within said front end side member when said rear end side member is engaged with front end side member.

In use of the plug-in connector according to the present invention, it is possible to connect a single mode optical fiber and a multimode optical fiber on the front side of the package board. Further, since the guide pins and the connector housing fixing screws are formed integral with each other, it is possible to increase the connector mounting space or the number of the connectors. Furthermore, the two different, electrical and optical, connectors can be attached to a small-sized (e.g. 100 mm wide) package board.

BRIEF DESCRIPTION OF THE DRAWINGS

The features and advantages of the plug-in connector according to the present invention over the prior-art connector will be more clearly appreciated from the following description taken in conjunction with the accompanying drawings in which like reference numerals designate corresponding elements and in which:

FIG. 9(A) is a cross-sectional view showing an engagement relationship between a plug aligning jig and the optical connector jack;

FIG. 9(B) is a side view showing the optical connector plug engaged with the plug aligning jig shown in FIG. 9(A); and FIG. 9(C) is a cross-sectional view showing the plug side jig, when seen from the plug insertion side, taken along the line IX(C)—IX(C) in FIG. 9(A).

DETAILED DESCRIPTION OF THE PREFERRED EMBODIMENTS

To facilitate understanding of the present invention, a reference will be made to a prior-art plug-in connector, with reference to the attached drawings.

Figure 1A:
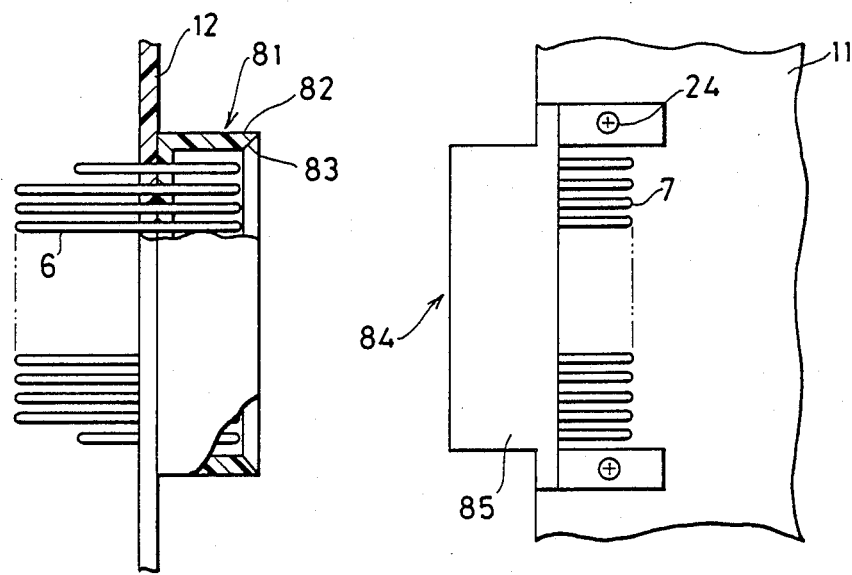
FIG. 1(A) is a partially broken plan view showing an example of prior-art electrical plug-in connectors.

FIG. 1(A) shows an example of prior-art plug-in type electrical connectors. As shown, a backboard connector 81 comprises a housing 82 and plural male electric terminals 6. The housing 82 is fixed to a back wiring board 12 together with the terminals by soldering, for instance. Further, the housing 82 is formed with guide taper portions 83. The package connector 84 is fixed to a package board 11 with fixing screws 24. Further, elastic female electric terminals 7 are arranged within the housing 85.

Therefore, when the package board 11 is inserted into a unit (not shown), since the front portion of the package connector 84 is guided by the guide taper portions 83 formed in the backboard connector 81, while absorbing dimensional tolerance, so that the package connector 84 is adjustably moved so as to be fitted to the backboard connector 81 (for determining an engagement location between the two). When the package board 11 is further inserted, the electric terminals of the backboard connector 81 are engaged with the those of the package connector 84 for providing an electric connection.

As described above, in the prior-art plug-in electric connector, the structure is such that the package connector 84 is fixed to the package board 11; the backboard connector 81 is fixed to the back wiring board 12, respectively; and further connectors are located for mutual engagement in dependence upon the housing guidance.

In the case of electricity, electric connection is achieved through contact between two mated metal terminals. In the case of light, optical connection is achieved by mating two ends of two optical fibers held within plug and jack and further by aligning the optical central axes of the two optical fibers (optical axis alignment). In this optical axis alignment, since optical signals are transmitted through the core (about 10 m in diameter of a single mode fiber) of two optical fibers, the axis alignment precision (on the order of micron) is high, as compared with the electric connector location precision, (on the order of millimeter). In order to realize excellent characteristics by engaging optical connectors of plug-in type, it is necessary to design the backboard connector of plug-in type as floating structure for providing a high precise location.

Further, in the case of coaxial connectors, the coaxial cable is connected in the same manner as in optical fibers. That is, a central conductor and an outer conductor held within plug and jack are connected so that two central axes match each other. Therefore, it is possible to consider the plug-in optical connector as the coaxial cable connector by matching the outer diameter of the plug and jack of the coaxial connector with that of the optical connector. Therefore, where there exists no difference between the coaxial cable and optical connections, the description of the optical connection can be applied to the coaxial cable connection, hereinafter.

Figure 1B:
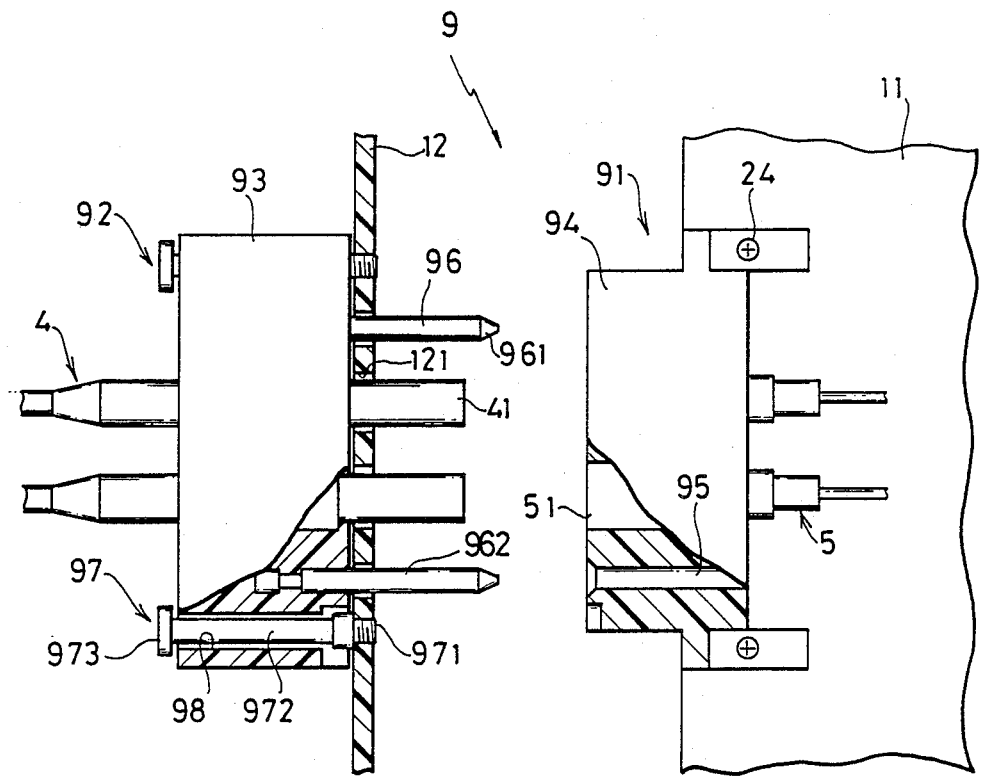
FIG. 1(B) is a partially broken plan view showing an example of prior-art optical plug-in connectors.

FIG. 1(B) shows an example of prior-art plug-in optical connectors. In the drawing, the plug-in optical connector 9 comprises a package connector 91 fixed to the package board 11 and a backboard connector 92 mounted on the back wiring board 12. The package connector 91 comprises a housing 94 formed with guide holes 95 and a jack 5 held in the housing 94 and fixed to the package board 11 with fixing screws 24. On the other hand, the backboard connector 92 comprises a backboard housing 93, plugs 4, guide pins 96 and floating screws 97. In this case, the backboard housing 93 is fixed to the back wiring board 12 with floating screws 97. That is, the floating screw 97 is composed of a top end fixing portion 971, a central floating holding portion 972 and push portion 973. This fixing portion 971 is fixed to the back wiring board 12 by screw. Although the backboard housing 93 is held by the fixing portion 971 and the push portion 973 of the floating screw, since a gap is provided between the floating holding portion 972 and the hole 98 formed in the backboard housing 93, the backboard housing 93 is moved in the surface direction of the backboard wiring board 12 within this gap and then fixed. An end portion 41 of the plug 4 is passed through the backboard wiring board 12. The inner diameter of the plug through hole 121 is determined larger than the outer diameter f the plug 4 so that the backboard housing 93 is movable. The guide pin 96 is formed with a tapered guide portion 961 at an end, and the left side portion 962 (in FIG. 1 (B)) of the guide pin 96 is insertion-molded within the housing.

In the above-mentioned plug-in connector, even if the package board 11 is inserted at a little offset position due to the dimensional tolerance of the unit, the tapered guide portion 961 of the guide pin 96 of the backboard connector 92 is fitted to the guide hole 95 of the package connector 91, so that the movable backboard housing 93 is guided or moved. That is, the backboard connector 92 moves so as to be fitted to the package connector 91 on the surface of the back wiring board 12. Therefore, the connector 92 is located accurately to the package connector 91. Under the condition where the guidance has been completed, the relative positional offset between the backboard connector 92 and the package connector 91 in the surface direction is such an extent as a clearance between the guide pin 96 and the guide hole 95. Further, when the package board 11 is inserted, the end portion 51 of the jack 5 of the package connector 91 is fitted to the end portion 41 of the plug 4 of the backboard connector 92 for providing an optical connection.

As described above, in the electric connector, the electric terminals 6 are fixed to the back wiring board 12; the package connector 84 and the backboard connector 81 are engaged; and thereafter the electric terminals 6 are connected. In contrast with this, in the case of the optical connector, the backboard connector 92 is formed into a floating structure; the package connector 91 and the backboard connector 92 are aligned accurately in dependence upon the guide function of the guide pin 96 and the floating structure of the backboard housing 93, and thereafter the plug 4 and the jack 5 are fitted to each other to attain an optical axis alignment on the order of micron.

As described above, since there exists a difference in connection method between electricity and light, in the prior-art component mounting method, different electric and optical plug-in connectors are provided according to the necessity.

Therefore, where electric and optical connections are made by the prior-art plug-in connectors, different electric connectors and optical connectors are mounted on a package board for signal transmission. Therefore, an appropriate space where the electric and optical connectors are fixed without interference with each other is required, so that the connector terminal mounting space is narrowed or the number of electric terminals or plugs/jacks is limited, thus resulting in a problem in that the mounting efficiency is low.

In addition, where many diversified terminals are required to be mounted, since it is necessary to prepare electric and optical connectors of many kinds, there exists a problem in that the prior-art connectors cannot satisfy various requirements.

Furthermore, in the prior-art optical connector, since plural guide pins and plural connector housing fixing screws are provided separately, the element mounting efficiency is low.

In view of the above description, reference is now made to an embodiment of the plug-in connector according to the present invention, with reference to the attached drawings.

Figure 2:
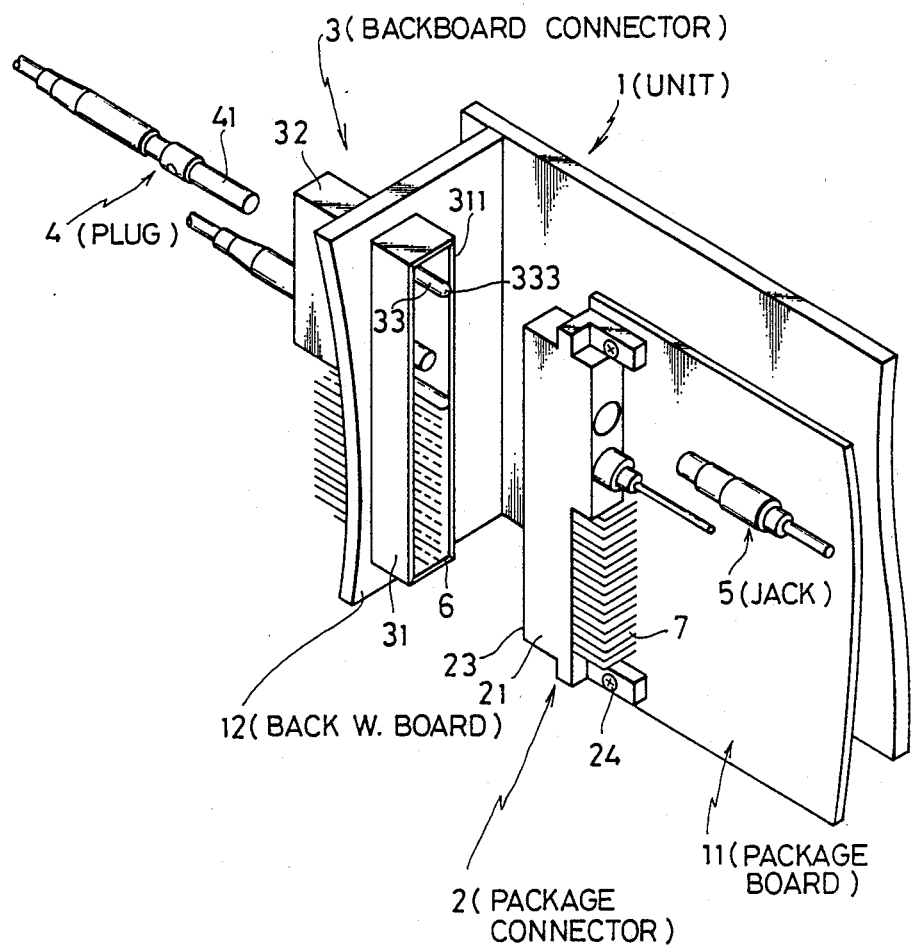
FIG. 2 is a perspective view showing a plug-in connector according to the present invention to construct an assembly unit.
Figures 3A, 3B:
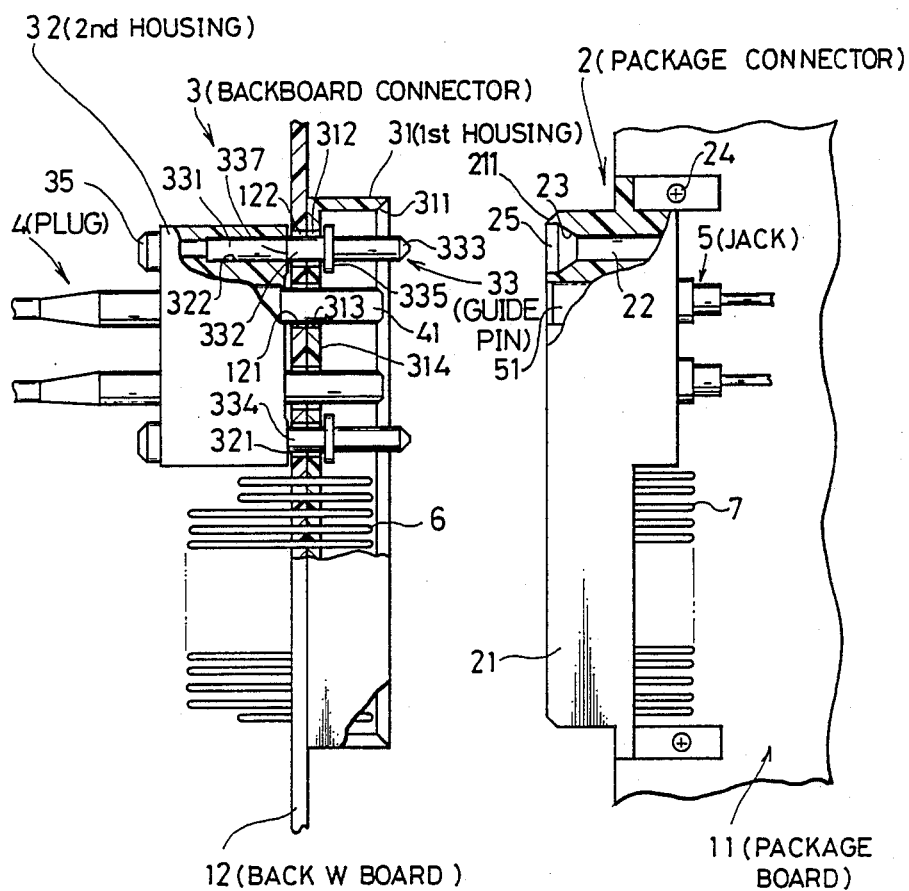
FIG. 3(A) is a partially broken side view showing a backboard connector according to the present invention.
FIG. 3(B) is a partially broken side view showing a package connector according to the present invention.

FIG. 2 is a perspective view showing one embodiment of the present invention, and FIG. 3(A) and (B) are partially broken side views thereof. As shown in the drawings, a package board 11 (on which various parts are mounted) is connected to a back wiring board 12 provided on the reverse side of a unit 1. In practice, however, a plurality of package boards are connected in multilayer fashion to the back wiring board 12 reverse side of the unit 1.

The plug-in connector is composed of a package connector 2 to a package board 11 and a backboard connector 3 mounted on a back wiring board 12. The package connector 2 includes a housing 21 formed with two guide holes 22, two truncated conical tapered portions 23 and two guide flange locating portions 25, jacks 5 and female electric terminals 7 both held therein. This package connector 2 is fixed to the package board 11 with fixing screws 24. On the other hand, the backboard connector 3 includes a first housing 31, a second housing 32, and, a back wiring board 12 sandwiched between the two housings 31 and 32. The first housing 31 is formed with electric terminals 6, two guide tapered portions 311, two guide pin through holes 312, and two plug through holes 313. This first housing 31 is engaged with the back wiring board 12 by friction force obtained when the electric terminals 6 are pressure-fitted into holes formed in the first housing 31 and the back wiring board 12. The second housing 32 includes two plugs 4 and two guide pins 33. The plug 4 passes through a plug through hole 121 of the back wiring board 12 and a plug through hole 313 of the first housing 31 in such a way that an end 41 of the plug 4 projects from the board 12. The guide pin 33 is formed with a fixing portion 331 fixed to the second housing 32, a floating holding portion 332 and a guide portion 333. The floating holding portion 332 is formed with a cylindrical portion 333 whose diameter is smaller than that of the guide pin through hole 312 formed in the first housing 31 and a flange portion 335 whose diameter is larger than that of the same hole 312. Therefore, the back wiring board 12 and the bottom surface 314 of the first housing 31 are sandwiched between the flange portion 335 and the front surface 321 of the second housing 32. Since the outer diameter of the floating holding portion 332 of the guide pin 33 is smaller than the inner diameter of the guide pin through hole 312, there exists a gap (adjusting radial play) between the guide pin 33 and the guide pin through hole 312 so that the second housing 32 can be adjustably held through the gap by the first housing 31. Further, when the two connectors 2 and 3 are engaged with each other, the flange portion 335 is placed in the guide pin locating portion 25 formed in the package connector housing 21.

In the plug-in connector as described above, when the package board 11 is required to the inserted into the unit 1, first the two top end guide portions 333 of the guide pins 33 of the second housing 32 of the backboard connector 3 are guided and fitted into guide holes 22 formed in the package connector housing 21. In this case, even if the package board 11 is inserted into the unit 1 under a little offset condition within dimensional tolerance, as the package board 11 is being inserted, the guide pin 33 is fitted to the guide hole 22 so that the positions of the guide pins 33 are determined by the guide holes 22. That is, the second housing 32 of floating structure moves according to the position of the package connector 2 to absorb positional offset. As described above, the second housing 32 is located relative to the package connector 2 within a positional offset clearance corresponding to a clearance between the guide pin 33 and the guide hole 22.

When the package board 11 is further inserted, under the condition that the relative positional relationship between the package connector 2 and the second housing 32 is kept as it is, the housing guide portions 211 of the package connector 2 are guided by the guide taper portions 311 of the first housing 31. Therefore, the package connector 2 is fitted to the first housing 31 within the dimensional tolerance of the unit 1 so that the package connector 2 is located to the first housing 31. As described above, the first housing 31 and the second housing 32 are located to the package connector 2.

The plugs 4 and the jacks 5 are engaged with each other after the guide pins 33 are fitted to the guide holes 22. That is, once the guide pins 33 have been fitted to the guide holes 22, the package connector 2 is located to the second housing 32 at a correct position (where the ends 51 of the jacks 5 can be engaged with the ends 41 of the plugs 4). Therefore, as the package board 11 is being inserted, the plugs 4 and jacks 5 are engaged with each other, so that optical connection can be achieved.

Further, the electric connection can be performed after the package connector 2 and the first housing 31 have been guided or fitted by the housing guide portions 211 of the connector 2 and the guide tapered portions 311 of the first housing 31. That is, once engaged with each other, the package connector 2 are located to the first housing 31 at a correct position (where the electric terminals 7 of the package connector 2 can be engaged with the electric terminals 6 of the first housing 31). Therefore, as the package board 11 is being inserted, the electric terminals 7 of the package connector 2 and those 6 of the first housing 31 are engaged with each other, so that electric connection can be achieved.

In assembly of the backboard connector 3, the guide pin 33 is inserted into a guide pin fixing hole 322 formed in the second housing 32 from the front surface of the first housing 31 through the guide pin through holes 312 and 122, and thereafter fixed to the second housing 32 with a guide pin fixing screw 35. In the guide pin 33, the diameter of the fixing portion 331 is smaller than that of the floating holding portion 332. Therefore, a stepped (shoulder) portion 337 is formed between the two portions 331 and 332. The rear portion of the fixing portion 331 is formed with a female thread portion into which the fixing screw 35 is screwed. On the other hand, the diameter of the guide pin fixing hole 322 of the second housing 32 is almost the same as that of the fixing portion 331 of the guide pin 33. Therefore, after the guide pin 33 has been inserted into the guide pin fixing hole 322, when the fixing screw 35 is tightened, the guide pin 33 is fixed to the second housing 32 because the edge of the guide pin fixing hole 322 is urged against the stepped portion 337 of the guide pin 33.

In the above-mentioned structure, it is possible to perform the maintenance work of the second housing 32, without extracting the package board 11 from the backboard connector 3, from the rear side of the back wiring board 12. That is, when the fixing screw 35 is removed, it is possible to remove only the second hosing 32 from the back wiring board 12, where necessary.

Figure 4B:
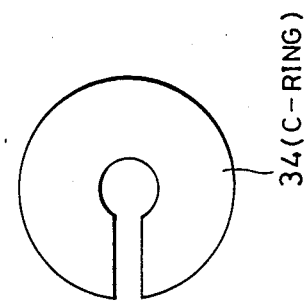
FIG. 4(B) is an enlarged plan view showing a C-ring shown in FIG. 4(A)
Figure 4A:
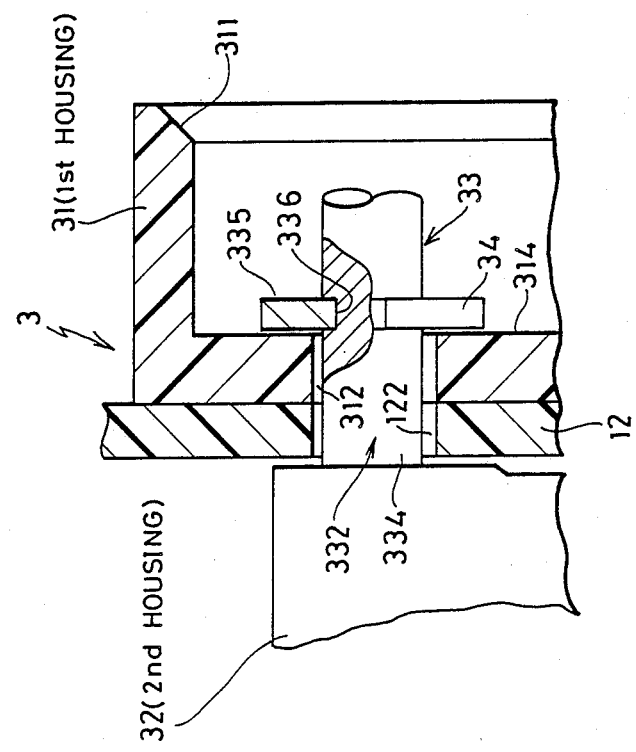
FIG. 4(A) is an enlarged side view showing a modification of the structure of the second housing.

In the above embodiment, it is possible to use bolt and nut (not shown) instead of the fixing screw 35 to fix the guide pin 33. Further, it is possible to fix the guide pin 33 from the front side (the right side in the drawing) of the first housing 31 as shown in FIG. 4(A). In FIG. 4(A), the floating holding portion 332 of the guide pin 33 is formed with a groove 336, and a C-ring as shown in FIG. 4(B) is fitted to this groove 336. In this structure, the guide pins 33 are insertion molded together with the second housing 32; the second housing 32 is inserted from the rear side (the left side in the drawing); the C-ring 34 is fitted to the groove 336 from the front side of the first housing 31 previously fixed to the back wiring board 12. In this embodiment, it is possible to floatingly hold the second housing 32 relative to the back wiring board 12.

In the above embodiment, the first housing 31 is fixed to the back wiring board 12 by the electric terminals 6 pressure fitted to each other. That is, although not shown, the inner diameter of the terminal holes of the first housing 31 and that of the back wiring board 12 are determined to be a little smaller than the diameter of the electric terminals 6 so as to be pressure fitted. Therefore, the electric terminals 6 are pressure fitted to the first housing 31 and the back wiring board 12 to fix both the members. However, it is possible to fix both the members by soldering the electric terminals 6 instead of pressure fitting. Further, it is also possible to fix the first housing 31 to the back wiring board 12 with screws or other fixing means.

Figure 5:
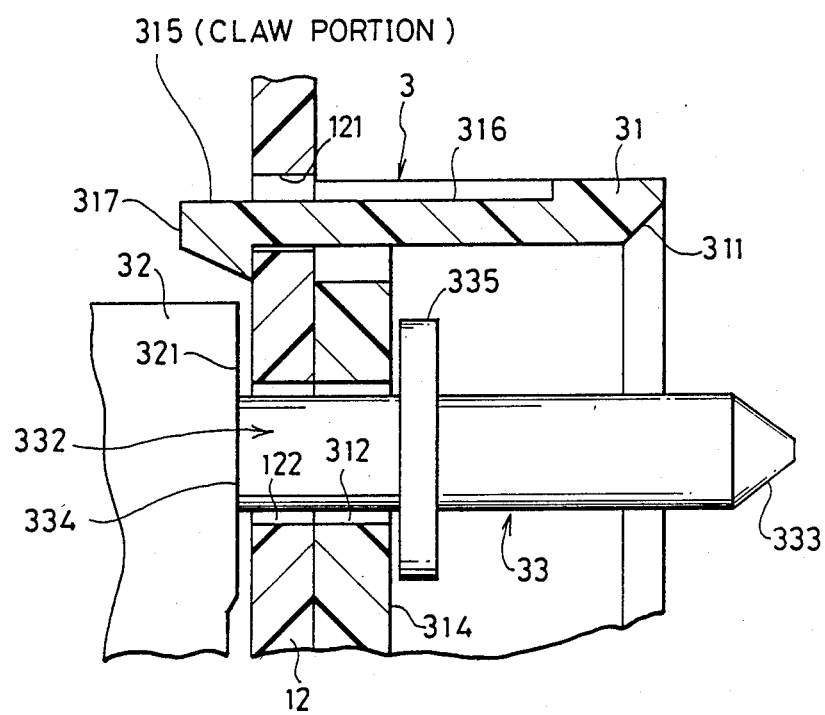
FIG. 5 is an enlarged side view showing another modification of the first housing fixing means.

FIG. 5 shows an example of other fixing means, in which the first housing 31 is formed with two engagement claw members 315 and two holes 121 are formed in the back wiring board 12 so that each projected portion 317 of the engagement claw member 315 is fixedly engaged with the back wiring board 12 through the holes 121 to fix the first housing 31 to the wiring board 12. This method is effective when the number of the electric terminals in small, because it is possible to securely fix the first housing 31 to the back wiring board 12.

Figure 6:
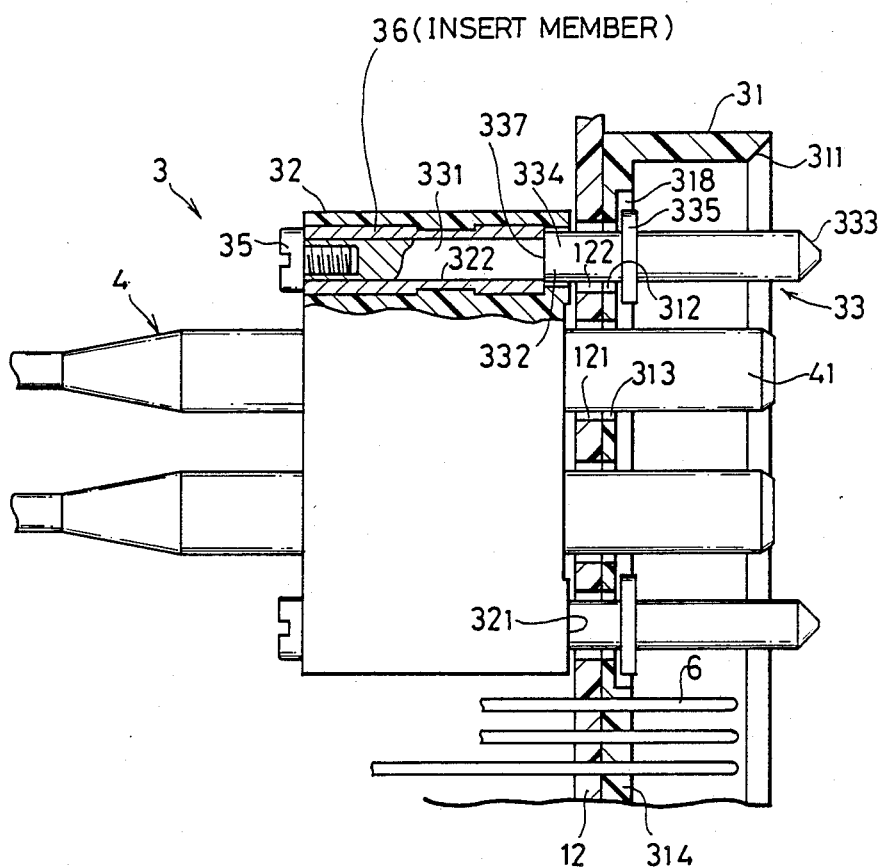
FIG. 6 is an enlarged partially broken side view for assistance in explaining another modification of the guide pin fixing structure.

FIG. 6 shows another embodiment related to the structure of the guide pin 33 of the second housing 32. Since the guide pins 33 are used to determine the positional relationship between the package connector 2 and the second housing 32, a high fixing precision is required to fix the guide pin 33 to the second housing 32. This embodiment shows a structure by which it is possible to fix the guide pin 33 to the second housing 32 at high precision. That is, the structure of the guide pin 33 is substantially the same as that of the first embodiment. However, the structure of the guide pin fixing hole 322 is different. In the first embodiment, the guide pin fixing holes 322 are directly formed in the second housing 32. In this embodiment, however, the guide pin fixing hole 322 is formed by insertion molding a metallic insert member 36 in the second housing 32. In other words, a guide pin fixing hole 322 is previously formed precisely in the insert member 36, and this insert member 36 is insertion molded in the second housing 32 to construct a guide pin fixing hole 322. By this method, it is possible to precisely form the guide pin fixing hole 322 in the second housing 32. Further, since the insert member 36 is made of a metal, it is possible to increase the fixing strength of the guide pin 33 to the second housing 32.

FIG. 6 also shows a structure for effectively burying the flange portion 335 of the guide pin 33. That is, the bottom surface 314 of the first housing 31 is formed with a guide pin placing recessed portion 318 deep enough to accommodate the flange portion 335 of the guide pin 33 and broad enough not to interfere with the flange portion 335 even when the guide pin 33 is moved for floating adjustment. However, the length of the floating support portion 332 of the guide pin 33 is shortened by a dimension corresponding to the depth of the guide pin placing recessed portion 318 as compared with the length of that shown in the first embodiment. In this structure, it is possible to eliminate the guide pin locating portion 25 (see FIG. 3(B)) formed in the package housing 21 and further shorten the length of the guide pin 33 by a length corresponding to a depth of the guide pin placing recessed portion 318.

As described above in the above-mentioned embodiments, it is possible to construct a plug-in connector as a complex connector for electric and optical (or coaxial) cables. Further, the guide pins are advantageously formed integral with the floating screws. Conventionally, two different connectors (electric connectors and optical or coaxial connectors) are required when electric and optical (or coaxial) cable signals are transmitted between the package board and the back wiring board. In the present invention, one connector can transmit signals between the two. Therefore, it is possible to minimize the connector mounting space without interference with each other, and therefore the connecting space can be utilized more effectively or the number of connector terminals can be increased. Further, electric and optical elements can be mounted on the same connector, it is possible to satisfy diversified connection requirements, with more flexibility, as compared with when two separate connectors are used.

The optical connector suitable for use in the plug-in connector according to the present invention will be described in detail below.

Conventionally, there have been known optical connectors for coupling an optical connector plug for accommodating a ferrule mounted at an end of a first optical fiber and an optical connector jack for accommodating another ferrule mounted at an end of a second optical fiber via a housing.

In the optical connector of this type, in particular in an optical connector for a single mode fiber, however, since the dimensional precision of the ferrule and the optical fiber is not satisfactory in the current manufacturing technology, there exists a problem in that the center of the fiber will not coincide with that of the ferrule and therefore an eccentricity is produced between the two. When two ferrules to each of which a fiber is connected eccentrically are connected to each other, since the two optical axes of the two connected fibers are not aligned or offset, there exists a problem in that fiber coupling power loss increases.

In the optical plug according to the present invention, since a ferrule alignment function is provided in the plug itself, there exist such advantages that the number of parts is small and the size of the plug is reduced. In addition, since the plug body is simple in shape and therefore no special precision and no complicated shape are needed, the plug can easily be manufactured by use of plastic material, so that there exist other advantages such that the cost is low (about 0.8 times as compared with the prior-art plug, excluding the cost of ferrule) and the weight is small (about 0.7 times as compared with the prior-art plug).

Further, in a plug and jack alignment jig (or tool) according to the present invention, since it is possible to previously check the radial eccentricity direction of the ferrule housed in the plug body (or sleeve) and therefore to match the eccentricity direction of the two ferrules housed in the plug and jack bodies, without disassembling the plug and jack, it is possible to easily manufacture low coupling power loss optical connectors, thus increasing the mass productivity and decreasing the cost thereof.

In the above-mentioned alignment jig, a first member engaged with a plug and a second member engaged with a jack are connected to each other, and further three grooves engageable with the reference plug locating projection (or key) are formed at an inner circumferential surface of an insertion hole to which the plug is fitted. Therefore, the above-mentioned jig structure facilitates the plug and jack alignment work.

The optical plug and optical jack and further the alignment jig according to the present invention will be described in further detail with reference to the attached drawings.

Figure 7B:
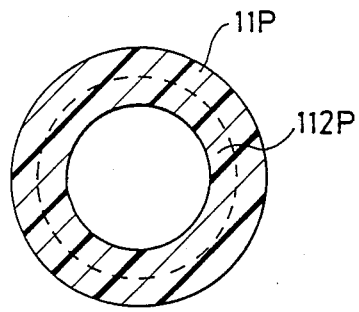
FIGS. 7(B), (C) and (E) are cross-sectional views showing the front end side member of the plug, taken along the lines VII(B)—VII(B), VII(C)—VII(C), and VII(E)—VII(E) in FIG. 7(A)
Figure 7C:
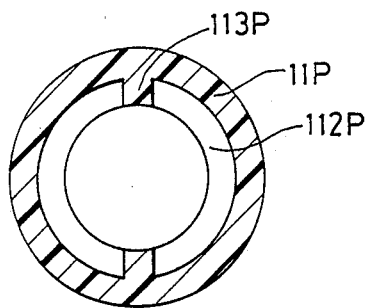
FIG. 7(A) is a partially broken side view showing an optical connector plug of the present invention.
FIGS. 7(D) and 7(F) are cross-sectional views showing the rear end side member of the plug, taken along the lines VII(D) and VII(F) in FIG. 7(A)

FIG. 7(A) shows an optical connector plug applied to a plug-in optical connector of the present invention for directly connecting a package board, on which optical elements are mounted, to a back wiring board. In the drawing, a cylindrical optical connector plug 4 comprises a plug front end side member 11p and a plug rear end side member 12p coupled to the plug front end side member 11P. Within the plug front end side member 11P, a ferrule 14P connected an end of an optical fiber 13P is accommodated. The plug front end side member 11P is formed with three coupling grooves 111P (See FIG. 7(E)) arranged at regular angular intervals (120 degrees) in the circumference thereof at the rear end (the right) side thereof. Each coupling groove 111P extends in the axial direction of the member 11P from the rear end and then turns in the circumferential direction of the member 11P so as to form an L-shaped groove 111P. Each end surface of the coupling groove 111P is formed into a semicircular shaped. Further, the plug front end side member 11P formed with an inner annular step portion 112P (See FIG. 7(B)) to stop the ferrule 14P. This inner annular step portion 112P is formed with two projections 113P (See FIG. 7(C)) engaged with two opposing cutout grooves 142P formed in a flange portion 141P of the ferrule 14P at 180 degree intervals to prevent the ferrule 14P from being rotated.

An front end of the plug rear end side member 12P is inserted into the plug front end side member 11P, and a coil spring 15P is disposed between the flange portion 141P of the ferrule 14P and the front end of the plug rear end side member 12P to urge the flange portion 141P of the ferrule 14P against the step portion 112P of the plug front end side member 11P, so that the ferrule 14P can be fixed within the plug front end side member 11P.

Figure 7D:
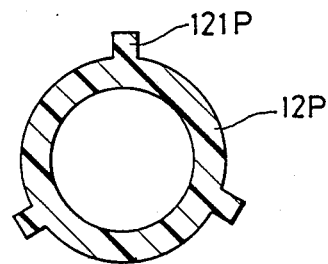
Figure 7E:
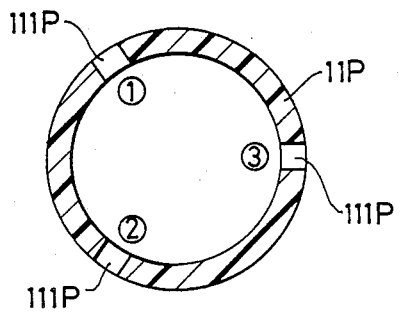
Figure 7F:
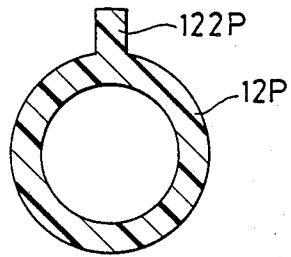

The plug rear end side member 12P is formed with three cylindrical coupling projections 121P (See FIG. 7(D)) on the front side thereof so as to be engageable with the three coupling grooves 111P formed in the plug front end side member 11P, and a reference guide projection 122P (See FIG. 7(F)) arranged on the same axial line as one of the three cylindrical coupling projections 121P. Further, a snap-out ring 16P formed with an axially extending slit 161P engaged with the reference guide projection 122P is slidably fitted to roughly the longitudinally middle portion of the plug rear end side member 12P. This guide projection 122P is engaged with a guide groove 21P of an outer housing 2P (e.g. the second housing 32 of the backboard connector 3 shown in FIG. 2) to which the front and rear end side members 11P and 12P are inserted to prevent the optical connector plug 4 from being rotated. In addition, a snap ring 22P is disposed within the outer housing 2P at the middle portion thereof so as to be brought into contact with the rearmost end surface of the plug front, side member 11P to prevent the member 11P from being removed from the outer housing 2P. Further, when the optical connector plug 4 is required to be removed from the outer housing 2P, the snap-out ring 16P is pushed toward the front end side member 11P with an appropriate jig to spread the snap ring 22P in the radially outward direction, so that the snap ring 22P is released from the outer circumferential surface of the front end side member 11P.

Figure 8:
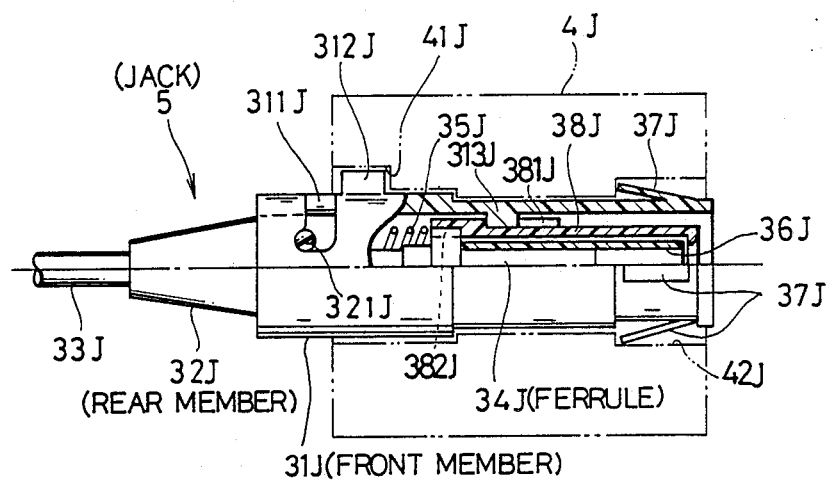
FIG. 8 is a partially broken side view showing an optical connector jack of the present invention.

FIG. 8 shows an optical connector jack of the present embodiment. This optical connector jack 5 includes optical connector jack elements similar those of the optical connector plug 4 shown in FIG. 7(A) which is also inserted into a hole 42J of another outer housing 4J (e.g. the housing 21 of the package connector 2 shown in FIG. 2) for connection with the optical connector plug 4. This optical connector jack 5 comprises a jack front side member 31J provided with plural fixing springs 37J, a jack inner member 38J disposed within the jack front side member 31J, a jack rear end side member 32J coupled to the jack front end side member 31J, a ferrule 34J accommodated within the jack inner member 38J and fixed to an end of the optical fiber 33J, a spring 35J for urging the ferrule 34J against the jack inner member 31J, an aligning sleeve 36J for guiding and coupling the ferrule 14P of the plug front end side member 11P when coupled to the plug 4. The plural fixing springs 37J serve to fix the optical jack 5 to the outer housing 4J. The inner member 38J is formed with cutout grooves 381J and two projections 113P engaged with projections 313J formed in the front end side member 31J and cutout grooves 382J formed in a flange portion of the ferrule 34J, respectively, so as to be prevented from being rotated.

In the same way as the optical connector plug 4, the jack front end side member 31J is formed with plural L-shaped coupling grooves 311J, and the jack rear end side member 32J is formed with plural roughly cylindrical projections 321J to connect the two front and rear end side members 31J and 32J. Further, the jack front end side member 31J is formed with a single reference projection 312J, and the outer housing 4J is formed with a guide groove 41J for guiding this reference projection 312J to restrict the rotation of the optical connector jack 5.

In assembly of the optical plug 4, the ferrule 14P is inserted into the plug front end side member 11P from the right side in FIG. 7(A), and the two engagement projections 113P are engaged with the cutout grooves 142P of the ferrule 14P to accommodate the ferrule 14P within the plug front end side member 11P without rotation. Thereafter, the three projections 121P of the plug rear end side member 12P are inserted along the three grooves 111P to fasten the plug rear end side member 12P to the plug front end side member 11P in bayonet fashion. Therefore, the plug rear end side member 12P is inserted into the plug front end side member 11P against the elastic force of the coil spring 15P. Since the flange portion 141P of the ferrule 14P is urged against the step portion 112P by this coil spring 15P, the optical connector plug 4 can be assembled.

To connect the assembled optical connector plug 4 with the optical connector jack 5, the reference guide projection 122P of the optical connector plug 4 is engaged with the guide groove 21P of the outer housing 2P to insert the two members 11P and 12P into the outer housing 2P. On the other hand, the optical connector jack 5 is inserted into the outer housing 4J in the same manner. Thereafter, an end of the plug front end side member 11P of the optical connector plug 4 is inserted to an end of the jack front end side member 31J to butt or couple two ferrules 14P and 34J.

As described above, it is possible to select three kinds of combinations between each coupling groove 111P and each coupling projection 121P or 311J and 321J, thus enabling a coincidence of eccentricity between the two ferrules 14P and 34J.

The optical connector plugs of the present invention have the following features:

First, it is possible to adjust the eccentricity of ferrules 14P and 34J owing to the structure of the optical connector plug 4 formed with plural coupling grooves 111P, plural coupling projections 121P, and a single reference guide projection 122P. Since no special aligning parts are provided, the number of the parts can be reduced and therefore the productivity of the optical connector can be enhanced.

Secondly, since no special precisions and shapes are required for the elements of the optical connector plug 4 such as the plug front end side member 11P, the plug rear end side member 12P, etc., these elements can be manufactured in plastic molding process, thus facilitating the element manufacturing process and therefore economizing the cost of the optical connector.

Thirdly, since the angular position of the ferrule 14P of the plug front end side member 11P relative to the inner engagement projection 113P can be selected at two positions (180-degree angular positions) and further the coupling grooves 111P and the coupling projections 121P can be engaged in three different angular positions. That is, since the eccentricity can be adjusted in six different ways for each 60 degree, it is possible to accurately adjust the eccentricity and therefore to reduce the coupling power loss of the optical connector.

Further, when the four or more coupling grooves 111P and the coupling projections 121P are formed, it is possible to more finely adjust the eccentricity of the two ferrules 14P and 34J. Further, it is also possible to form coupling projections 121P in the plug front end side member 11P and coupling grooves 111P in the plug rear end side member 12P. Further, it is of course possible to adjust an eccentricity between the two ferrules by forming the optical connector jack 5 in the same structure as that of the optical connector plug 4.

On the other hand, it is preferable to make the important connector parts such as ferrule and aligning sleeves (the front and rear end side tubular members) of material which is resistant against abrasion or wear. In the prior-art optical connector, in general the ferrule is made of ceramics or stainless, and the sleeves are made of bronze. Therefore, when the plug is engaged with the jack, the ferrule scrapes or wears away the inner surface of the sleeves, so that bronze powder worn away from the sleeves sticks to the fiber core, thus resulting in a trouble in that the optical fiber coupling loss increases. To solve the above-mentioned problem, it has been necessary to often clean the plug and jack. However, this cleaning work is rather difficult because the plug-in connectors are arranged deep within the unit assembly. To overcome the above-mentioned problem, in the present invention, it is particularly preferable to make the ferrule and the sleeves (front and rear end side tubular members) of a wear resistant material such as zirconia ceramics.

FIG. 9(A) shows a fitting state where the optical connector plug 4 and the connector jack 5 are to be fitted to a plug aligning jig 5A according to the present invention. This plug aligning jig 5A is composed of a plug side jig 51A and a jack side jig 52A.

The plug side jig 51A is formed with an axially extending plug insertion hole 511A, and provided with a snap ring 512A attached to the plug insertion hole 511A for prevention of removal of the plug front end side member 11P. The plug side jig 51A is further formed with three insertion grooves 513A, on the inner circumferential surface end of the plug insertion hole 511A, into which the reference guide projection 122p of the optical connector plug 4 is inserted (See FIG. 9(B)). Three insertion grooves 513A are arranged at regular (120 degree) angular intervals as shown in FIG. 9(C), and three numbers 1, 2 and 3 are attached thereto in the clockwise direction (opposite to the coupling grooves 111p shown in FIG. 7(E)). Further, the plug side jig 51A is formed with the insertion groove 513A of No. 1 at a position corresponding to the guide groove 21P of the outer housing 2P, and further a flange 514A at the front surface end thereof.

The jack side jig 52A is formed with a jack insertion hole 521A at position opposite to the plug insertion hole 511A and an insertion groove 522A, into which the reference guide projection 312J of the jack 5 is inserted, on the inner circumferential surface end of the jack insertion hole 521A in order to prevent the rotation of the optical connector jack 5. Further, the jack side jig 52A is formed with a flange 523A at the front surface end thereof. The two flanges 514A and 523A are fixed by bolts 53A and nuts 54A in such a way that the radial direction of the insertion groove 513A of No. 1 (See FIG. 9(C)) matches that of the insertion groove 522A.

Further, the jack side jig 52A is formed with step portions 524A for stopping the fixing springs 37J of the optical connector jack 5 at roughly the center of the jig 5A, in order to prevent the optical connector jack 5 from being removed.

In eccentric adjustment of the plug and jack with the plug aligning jig 5A of the present invention, first two jigs 51A and 52A are fixed by bolts 53A and nuts 54A; secondly the plug front and rear end side members 11P and 12P are previously coupled in such a way that the reference guide projection 122P of the optical connector plug 4 matches the coupling groove 111p of. No. 1 at angular position. Thereafter, the optical connector jack 5 (which has previously assembled in such a way that the fiber eccentric radial direction of the ferrule matches the radial direction of the guide projection 312J) is inserted into the jack insertion hole 521A and the guide groove 522A of the jack side jig 52A. Then, the optical connector plug 4 is inserted into the plug insertion hole 511A (See FIG. 9(C)) in such a way that the reference guide projection 122P is engaged with the insertion groove 513A of No. 1, in order to connect the optical connector plug 4 with the aligning optical connector jack 5 (the insertion groove 513A of No. 1 and the coupling groove 111p of No. 1 are located at the same angular position). Under these conditions, the coupling power loss of the two ferrules 14P and 34J are measured. After the above-mentioned measurement has been completed, the engagement conditions of the snap ring 512A is released by the snap-out ring 16P; the optical connector plug 4 is removed from the plug side jig 51A.

Therefore, the same measurement is performed by engaging the reference guide projection 122P with the insertion groove 513A of No. 2 (the insertion groove 513A of No. 1 and the coupling groove 111P of No. 2 are located of the same angular position). Further, the same measurement is performed by engaging the reference guide projection with the insertion groove 513A of No. 3 (the insertion groove 513A of No. 1 and the coupling groove 111P of No. 3 are located at the same angular position).

After the above-mentioned measurements, the two front and rear end side members 11P and 12P of the optical connector plugs 4 are separated from each other in such a way that the ferrule 14P will not be removed from the plug front end side member 11P. Thereafter, the two front and rear end side members 11P and 12P are coupled again so that the reference guide projection 122P is located at the same angular position as the coupling groove 111P whose number is the same as one of the three numbers 1, 2 and 3 of the insertion grooves 513A, obtained when the minimum coupling loss has been measured by the above-mentioned measurement work. Thereafter, these two members 11P and 12P are fastened each other by means of adhesive or another method. By doing the above work, the fiber radial eccentricity direction of the ferrule of the optical connector plug can be set in the direction of No. 1 of the insertion groove 513A of the aligning jig 5A. The optical connector plug 4 obtained by coupling the two front and rear end side members 11P and 12P as described above is required to be inserted again into the plug side jig 51A, the best coupling condition can be obtained by inserting the guide projection 122p into the insertion groove 513A of No. 1. Under these conditions, since the guide groove 21P of the outer housing 2P corresponds to the insertion groove 513A of No. 1, it is possible to obtain the most preferable coupling condition when the optical connector plug 4 is inserted into the outer housing 2P so as to be coupled to the optical connector jack 5 whose radial eccentricity direction of the ferrule has also been matched with the angular position of the guide projection 312J.

As described above, when the plug aligning jig 5A according to the present invention is adopted, the two front and rear end side members 11P and 12P of the optical connector plug 4 can be aligned by simply separating the two members, thus facilitating the fiber core aligning work. Therefore, it is possible to manufacture a great number of optical connectors low in coupling loss and small in performance dispersion by the use of the optical connector plug 4 and the plug aligning jig 5A. Further, where and optical connector jack 5 whose eccentricity direction is not determined is coupled, it is possible to adjust the radial eccentricity direction of the optical connector plug by one-to-one correspondence method.

Further, when the number of combinations between the coupling groove 111p and the coupling projection 121p of the optical connector plug 4 is more than three, a plug side jig 51A formed with the insertion grooves 513A whose number is the same as that of the combination is used. In addition, it is possible to more finely adjust the eccentricity through the alignment work by changing the angular position of the ferrule 14P by 180 degrees relative to the engagement projection 113p of the plug front side member 11P.

In addition, it is also possible to enable the same aligning work as in the optical connector jack 5 when the coupling grooves 311J and the coupling projection 321J of the optical connector jack 5 are the same in structure as in the coupling grooves 111p and the coupling projections 121p of the optical connector plug 4 and further the insertion groove 522A of the jack side jig 52A is formed into the same shape as in the insertion grooves 513A of the plug side jig 51A. In this case, cylindrical projection portions 515A are provided at an end of the plug insertion hole 511A of the plug side jig 51A; a lock release ring 516A for pushing the fixing spring 37J downward is attached to the outer circumferential portion of this cylindrical projection portion 515A; and further this lock release ring 516A is formed so as to slide along the cylindrical projection portion 515A by means of rock release ring pull-out member (not shown). Under these conditions, the optical connector jack 5 can be removed without separating the plug side jig 51A and the jack side jig 52A with the optical connector plug 4 attached to the plug side jig 51A, thus facilitating the aligning work of the optical connector jack 5.

As described above, in the optical connector plug according to the present invention, there exists such an advantage that the ferrule aligning work required to realize a low coupling loss connector can be performed by using only the plug elements. Further, in the plug aligning jig according to the present invention, since the aligning work can be performed without disassembling the optical connector plug many times, there exists such an advantage that it is possible to easily manufacture optical connectors of low coupling loss, thus enhancing the productivity and economic effect.

What is claimed is:

1. A plug-in connector for connecting elements mounted on a package board (11) to other elements arranged on a back wiring board (12) disposed perpendicular to the package board, which comprises:
    (a) at least one first optical fiber coupling means (5) mounted on the package board (11);
    (b) at least one second optical fiber coupling means (4) arranged on the back wiring board (12) and coupled to said first optical fiber coupling means (5), said second optical fiber coupling means (4) being loosely passed through at least one hole (121) formed in the back wiring board (12);
    (c) at least two guide pins (33) formed, respectively with a guide portion (333), a flange portion (335), a floating support portion (332) loosely passed through a hole (122) formed in the back wiring board (12), and a fixed portion (331);
    (d) a package connector (2) fixed to the package board (11) and formed with at least two guide holes (22) including a truncated conical tapered portion (23), respectively to which the guide portion (333) of said guide pin is fitted, and with at least one hole (42J) to which said first optical fiber coupling means (5) is fitted;
    (e) a first connector housing (31) fixed to the back wiring board and engaged with said package connector (2), said first connector housing (31) being formed with at least two guide pin through holes (312) through each of which the floating support portion (332) of said guide pin (33) is loosely passed and with at least one second optical fiber coupling means through hole (313) through which the second optical fiber coupling means (4) is loosely passed; and
    (f) a second connector housing (32) formed with at least two guide pin fixing hole (322) to which the fixed portion (331) of said guide pin (33) is fixed and at least one hole (23P) to which the second optical fiber coupling means (4) is fitted, whereby said two guide pins (33) and said second optical fiber coupling means (4) all fixed to said second connector housing (31) loosely project, with a radial play, respectively from said back wiring board (12) and said first connector housing (31) via the through holes (312, 122 and 313, 121) formed in the back wiring board and said first connector housing, to support said second connector housing (32) under floating condition. relative to the back wiring board, by sandwiching the back wiring board (12) and the first connector housing (31) between said second connector housing (32) and the flange portions (335) of said guide pins (33), when the first connector housing (31) is not connected to said package connector (2).

2. The plug-in connector of claim 1, wherein said first optical fiber coupling means (5) includes an optical connector jack and said second optical fiber coupling means (4) includes an optical connector plug, or vice versa.

3. The plug-in connector of claim 1, wherein said package connector (2) further comprises a housing (21) formed with housing guide portions (211) and a plurality of first electrical connector terminals (7); and said back wiring board (12) further comprises the first connector housing (31) formed with guide tapered portions (311) and a plurality of second electrical connector terminals (6) coupled to the first electrical connector terminals (7), When said package connector (7) is coupled to said first connector housing (31) with the guide portions (211) of the housing (21) being guided along the guide tapered portions (311) of the first connector housing (31).

4. The plug-in connector of claim 1, wherein the flange portion (335) of said guide pin (33) is a C-ring (34) fitted to a groove (336) formed in said guide pin.

5. The plug-in connector of claim 1, wherein said first connector housing (31) is fixed to the back wiring board (12) with two claw portions (315) engaged with two holes (121) formed in the back wiring board.

6. The plug-in connector of claim 1, which further comprises at least two metallic insert members (36)

insertion molded together with said second connector housing (32) to guide said guide pins (33), respectively.

7. The plug-in connector of claim 2, wherein said optical connector plug (4) comprises:
  (a) a ferrule (14P) attached to one end of an optical fiber (13P) and formed with a flange portion (141P) including at least one cutout portion (142P);
  (b) a front end side member (11P) formed with an inner step portion (112P) including at least one inner projection portion (113P) engaged with the cutout portion of said ferrule, and with at least three L-shaped grooves (111P) arranged at regular angular intervals;
  (c) a rear end side member (12P) formed with at least three projections (121P) selectively engaged with the three L-shaped grooves by changing angular position and with a reference guide projection (122P) engaged with a guide groove (21P) of said second connector housing (2P or 32); and
  (d) a spring (15P) disposed between the flange portion (141P) of said ferrule (14P) and an inner end of said rear end side member (12P) to fix said ferrule (14P) within said front end side member (11P); when said rear end side member (12P) is engaged with front end side member (11P).

8. The plug-in connector of claim 7, wherein said plug includes a ceramic ferrule to be coupled to a ceramic sleeve of a mated jack.

9. The plug-in connector of claim 7, wherein the three projections (121P) of said rear end side member (12P) are selectively engaged with the three L-shaped grooves (111P) of said front end side member (11P) in such a way that coupling loss between optical connector plug and jack can be minimized with an optical fiber aligning jig (5A) including;
  (a) a plug side jig member (51A) formed with a plug insertion hole (511A) including plural guide grooves (513A), to which the guide projection (122P) of the connector plug (4) is fitted, arranged at regular angular intervals along an inner end circumference of the plug insertion hole; and
  (b) a jack side jig member (52A) formed with a jack insertion hole (521A) including a single guide groove (522A) to which a guide projection (312J) of the connector jack 5 is fitted.

10. An optical connector plug (4), comprising:
  (a) a ferrule (14P) attached to one end of an optical fiber (13P) and formed with a flange portion (141P) including at least one cutout portion (142P);
  (b) a front end side member (11P) formed with an inner step portion (112P) including at least one inner projection portion (113P) engaged with the cutout portion of said ferrule, and with at least three L-shaped grooves (111p) arranged at regular angular intervals;
  (c) a rear end side member (12P) formed with at least three projections (121P) selectively engaged with the three L-shaped grooves by changing annular position and with a reference guide projection (122P); and
  (d) a spring (15P) disposed between the flange portion (141P) of said ferrule (14P) and an inner end of said rear end side member (12P) to fix said ferrule (14P) within said front end side member (11P) when said rear end side member (12P) is engaged with front end side member (11P).

11. The optical connector plug of claim 10, wherein said ferrule is a ceramic ferrule.

12. The optical connector plug of claim 10, wherein the three projections (121P) of said rear end side member (12P) are selectively engaged with the three L-shaped grooves (111P) of said front end side member (11P) in such a way that coupling loss between optical connector plug and jack can be minimized with an optical fiber aligning jib (5A) including:
  (a) a plug side jig member (51A) formed with a plug insertion hole (511A) including plural guide grooves (513A), to which the guide projection (122P) of the connector plug (4) is fitted, arranged at regular angular intervals along an inner end circumference of the plug insertion hole; and
  (b) a jack side jig member (52A) formed with a jack insertion hole (521A) including a single guide groove (522A) to which a guide projection (312J) of the connector jack 5 is fitted.

* * * * *

UNITED STATES PATENT AND TRADEMARK OFFICE
CERTIFICATE OF CORRECTION

PATENT NO. : 4,895,425                                        Page 1 of 4

DATED : January 23, 1990

INVENTOR(S) : IWANO ET AL

It is certified that error appears in the above-identified patent and that said Letters Patent is hereby corrected as shown below:

IN THE ABSTRACT:

Line 2, please change "backage" to --package--;

Line 9, after "different", please delete ",".

Col. 1, line 18, please change "In usual," to --Usually,--.

Col. 2, line 4, please change "backage" to --package--;

line 29, please change "hole" to --holes--.

Col. 3, line 5, after "with" please insert --said--;

line 6, please delete "use of" and insert --using--.

Col. 5, line 21, please change "f" to --of--;

lines 62-63, please delete "according to the necessity" and insert therefor --accordingly--.

Col. 7, line 5, please change "the" (second occurrence) to --be--;

line 47, please change "are" to --is--.

Column 8, lines 12-13, please change "hosing" to --housing--;

line 52, please change "in" to --is--.

Col. 9, line 43, after "Further," insert -- when--;

line 44, please delete "can be" and insert --are--.

Col. 10, line 10, after "of" insert --a--;

line 43, after "connected" insert --to--;

UNITED STATES PATENT AND TRADEMARK OFFICE
CERTIFICATE OF CORRECTION

PATENT NO. : 4,895,425
DATED : January 23, 1990
INVENTOR(S) : IWANO ET AL

It is certified that error appears in the above-identified patent and that said Letters Patent is hereby corrected as shown below:

Col. 10, line 53, please change "shaped" to --shape--;

line 54, after "11P" insert --is-- lines 59-60, after "portion" there should be no new paragraph;

line 62, please change "An" to --A--.

Col. 11, line 22, please delete ",";

line 34, after "similar" please insert --to--;

Col. 12, line 47, after "in" please insert --a--;

line 50, please delete "since";

line 51, please change "degree," to --degrees,--.

Col. 13, line 57, please delete "ceramics or stainless," and insert --ceramic or stainless steel--;

line 12, please delete "a";

line 20-21, please change "turbular" to --tubular--;

line 41, please change "111p" to --111P--;

line 47, after "at" please insert --a--;

line 67, please delete "previously--.

Col. 14, line 1, please change "111p" to --111P--;

line 2, after "at" insert --an--;

line 3, after "previously" please insert --been--;

line 14, please change "111p" to --111P--;

line 26, please change "of" to --at--;

UNITED STATES PATENT AND TRADEMARK OFFICE
CERTIFICATE OF CORRECTION

PATENT NO.  : 4,895,425
DATED       : January 23, 1990
INVENTOR(S) : IWANO ET AL It is certified that error appears in the above-identified patent and that said Letters Patent is hereby corrected as shown below:

Col. 14, line 45, after "fastened" please insert --to--;
       line 54, please change "122p" to --122P--.

Col. 15, lines 11 and 24, please change "111p" to --111P--;
       lines 12 and 25, please change "121p" to --121P--;
       line 18, please change "113p" to --113P--.

Col. 15, claim 1, line 67, after "respectively" please insert --,--.

Col. 16, claim 1, line 7, after "respectively" please insert --,--;
       line 14, please change "pin" to --pins--;
       line 16, please change "pin" to --pins--;
       line 29, after "respectively" please insert --,--.

UNITED STATES PATENT AND TRADEMARK OFFICE
CERTIFICATE OF CORRECTION

PATENT NO. : 4,895,425

DATED : January 23, 1990

INVENTOR(S) : Iwano, et al

It is certified that error appears in the above-identified patent and that said Letters Patent is hereby corrected as shown below:

Col. 17, claim 7, line 25, after "with" please insert --said--.

Col. 18, claim 12, line 32, please change "jib" to --jig--.

Signed and Sealed this

Twenty-seventh Day of August, 1991

Attest:

HARRY F. MANBECK, JR.

Attesting Officer

Commissioner of Patents and Trademarks